Feb. 7, 1956 A. F. PITYO 2,734,119
METHOD OF FORMING AND WELDING PINS TO METAL PARTS
Filed April 6, 1954
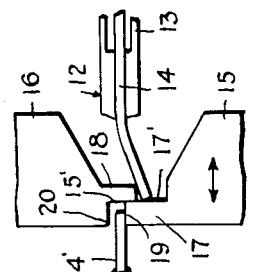
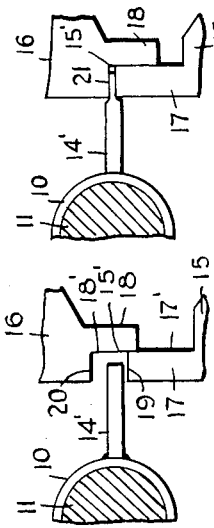
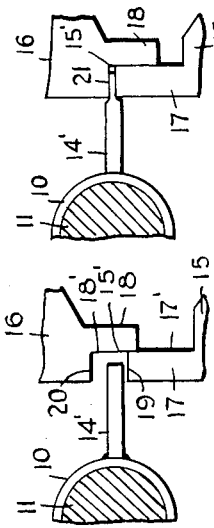
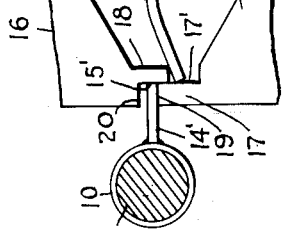
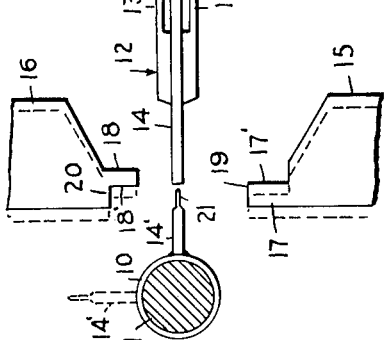
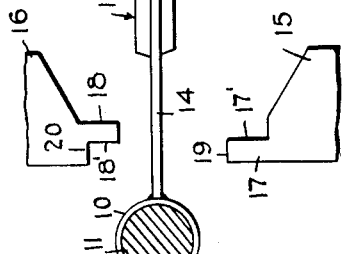
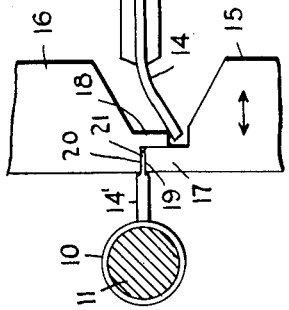
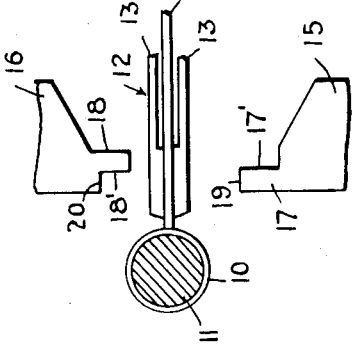
INVENTOR
ALBERT F. PITYO
BY
ATTORNEY United States Patent Office 2,734,119
Patented Feb. 7, 1956

2,734,119

METHOD OF FORMING AND WELDING PINS TO METAL PARTS

Albert F. Pityo, Cedar Grove, N. J.

Application April 6, 1954, Serial No. 421,262

6 Claims. (Cl. 219—10)

My invention relates to a method of and apparatus for forming and welding pins to metal parts.

In accordance with Patent 2,606,268, issued October 5, 1952, a wire is fed longitudinally into contact with a metal element, and then welded to such element. A flat portion is formed in the wire at a point spaced from the welded end of the wire, and after welding, the wire is severed through the flat portion, leaving such flat portion at the free end of the attached pin. The formation of the flat portion prior to severing, produces an irregular surface, which causes undue wear upon the feeding electrodes. The flat portions at the ends of the pins are important, since the outer ends of the pins with the flat portions may be readily embedded in plasticized portions of a glass rod or rods and will become securely anchored in such plasticized portions. The manner of applying the glass rod or rods having the plasticized portions to the pins having the flat portions is shown in my co-pending application for Method of and Apparatus for Attaching Glass Elements to Metal Parts, filed November 27, 1950, Serial Number 197,780.

I have also practiced the method of severing the wire which has been welded to the metal part, and subsequently flattening the outer end of the severed wire, at the point of severing. The severing is effected by relatively movable blades having a shearing action. The flattening of the outer end of the wire causes the material to spread longitudinally and laterally, and such material which is already contacting with the severing blade or blades crowds closer to them. It has been found that particles of metal from the wire work between the severing blades, having a shearing action, and this impairs the severing action of the blades, requiring frequent adjustments and resharpening of the blades.

In accordance with the present method, the wire is fed longitudinally to contact with the metallic element and is then welded to the element. After welding, the wire is next severed at a point spaced a selected distance from the metallic element to produce the pin of the desired length. The severing is effected by relatively movable blades having a shearing action and the contacting faces of these blades are arranged at the severing point during the severing operation. The severing occurs before the flattening of the outer end of the formed pin. Immediately after the severing is completed, a relative movement is effected between the severed pin and the contacting faces of the blades, so that the free end of the pin becomes spaced from the contacting faces of the blades. This is preferably effected by shifting the blades horizontally from the mandrel which carries the metallic element, but I contemplate shifting the mandrel from the blades. After the severing operation and the spacing of the free end of the pin from the contacting faces of the blades, the free end of the pin is flattened, to produce the outer flat end, which spreads out laterally and longitudinally. The material of the flat end now has sufficient space and will not crowd against the contacting faces of the blades, but will remain slightly spaced from such contacting faces, and there is no tendency for metal particles from the flat end working in between the contacting faces of the blades, and the disadvantages before referred to are eliminated.

In the accompanying drawings forming a part of this application and in which like numerals are employed to designate like parts throughout the same, Figure 1 is a side elevation, partly diagrammatic, illustrating the first step in the method, Figure 2 is a similar view, showing parts in the position illustrating the second step of the method, Figure 3 is a similar view, with parts adjusted to illustrate the third step in the method, Figure 4 is a similar view, with parts adjusted for illustrating the fourth step in the method, Figure 4ª is a view identical with Figure 4, upon an enlarged scale, parts broken away, Figure 5 is a view similar to Figure 4, showing parts further adjusted to illustrate the fifth step in the method, Figure 5ª is a view identical with Figure 5, upon an enlarged scale, Figure 6 is a view similar to Figure 4, showing the parts adjusted to illustrate a further step in the method or the starting of the first step, Figure 1, Figure 7 is an end elevation of the metal sleeve with the pins welded thereto, and, Figure 8 is a side elevation of the product shown in Figure 7.

In the drawings, the numeral 10 designates a metallic element or sleeve to have the pins welded thereto. This element or sleeve 10 is removably mounted upon a cylindrical mandrel or support 11, which is horizontally arranged and is intermittently turned upon its longitudinal axis. The mandrel 11 is electrically connected with one side of a welding circuit and constitutes one electrode. Arranged near and spaced from the mandrel 11 is an electrode 12, including two elements or jaws 13. These elements or jaws are reciprocated horizontally toward and from the mandrel or electrode 11. The electrode 12 is connected with the opposite side of the welding circuit. The electrode 12 has its jaws 13 receiving a wire 14 between them.

The numeral 15 designates a lower dies and 16 an upper die. The lower die 15 carries an upwardly projecting vertical blade 17, having a face 17', and the upper die or punch 16 carries a depending vertical blade 18, having a face 18', for having a shearing action with the face 17'. The upstanding blade 17 is provided at its top with a horizontal flattening face or shoulder 19, and the punch 16 has a horizontal flattening face or shoulder 20, disposed opposite to the shoulder 19.

In the practice of the method, the metallic sleeve 10 is held stationary upon the stationary mandrel 11. The jaws 13 having the metallic wire 14 between them, first slide longitudinally upon the wire 14, until the forward ends of the jaws 13 are near and spaced from the end of the wire 14, at which time the wire is clamped between the jaws 13. The jaws 13 now continue to move toward the sleeve 10 and these jaws bring the severed or butt end of the wire into contact with the metallic sleeve 10. The blades 17 and 18 are now in the opened position and hence the jaws can pass between them. When the end of the wire is brought into firm contact with the sleeve 10, the welding circuit is closed and the wire is welded to the sleeve 10. These steps are illustrated in Figures 1 and 6. The jaws 13 now release the wire against clamping engagement, and slide rearwardly along the wire, and are disposed rearwardly beyond the blades 17 and 18, Figure 2. The next step in the method is to sever the wire and produce a pin 14' of the selected length. This is accomplished by moving the die 15 vertically upwardly and the punch 16 vertically downwardly. The blade 18 now has shearing action with the blade 17, and the faces 18′ and 17′ contact or have shearing action. The severing of the wire occurs at a severing point 15′. This severing point is now spaced from the metallic sleeve 10 the proper distance for producing the pin 14′ in a desired length. The severed pin 14′ extends to the severing point 15′ and contacts with the shearing face. The flattening face or shoulder 20 is now spaced from the pin 14′. Before the flattening faces 19 and 20 act upon the pin 14′ to produce the flat ends, the die 15 and punch 16 with their blades 17 and 18 are shifted horizontally a slight distance so that the end of the pin 14′ becomes spaced from the faces 17′ and 18′, which still slidably contact. This step is clearly shown in Figures 4 and 4a. The next step is to continue the movement of the die 15 and punch 16 toward each other, so that the flattening face or shoulder 19 moves upwardly and the flattening face or shoulder 20 moves downwardly, forming the flat portion 21, Figures 5 and 5a. The material of the flat end portion spreads longitudinally and laterally, but still remains slightly spaced from the shearing faces 17′ and 18′, Figures 5 and 5a, so that there is no tendency for particles of metal cut from the wire passing between the shearing faces 17′ and 18′.

The die 15 and punch 16 are now returned to the opened position, Figure 6, and the mandrel 11 will be turned for ninety degrees, to bring the previously formed pin 14′ to the vertical position. The die 15 and punch 16 are now shifted toward the mandrel 11, in a horizontal plane, so that the faces 17′ and 18′ are at the normal selected distance from the sleeve 10 to accurately define the length of the pin. The jaws 13 now slide forwardly upon the wire 14 and have clamping engagement with the wire near the free end of the wire, Figure 1, and the continued movement of the jaws 13 bring the free end of the wire into contact with the sleeve 10, and the cycle of operation of the method is repeated.

During the severing operation, the blade 18 will bend the leading end of the severed wire 14 downwardly slightly, Figures 4 and 5, but when the blades 17 and 18 are separated, the free end of the wire returns to the straight elevated position, since it is sufficiently resilient. However, the jaws 13 reciprocating in a horizontal plane will also return the free end of the wire to the straight horizontal position.

The various elements used in the practice of the method are of course properly timed in operation. When the die 15 and punch 16 are shifted to the opened position, they are held in this opened position until the jaws 13 move the wire into contact with the sleeve 10 at which time, the welding circuit is closed and the wire welded to the sleeve 10. The jaws 13 are then shifted rearwardly out of the path of travel of the blades 17 and 18, Figure 2, and these blades are shifted inwardly to the closed position, Figure 3. After the severing operation, the die 15 and punch 16 are shifted from the severing point 15′ or the free end of the pin 14′, Figure 4, and continued inward movement of the parts 15 and 16 cause the faces or shoulders 19 and 20 to produce the flat ends 21. The movement of the parts 15 and 16 may be continuous and timed with respect to the horizontal movement of such parts 15 and 16 from the free end of the pin, or there may be a dwell in the vertical inward movement of the parts 15 and 16, while these parts are shifted horizontally from the point of severing, and after this dwell, the parts 15 and 16 continue their inward movement so that the faces 19 and 20 form the flat end 21. The parts 15 and 16 are then shifted to the opened position and the mandrel is turned for ninety degrees, Figure 6, and the parts 15 and 16 are again shifted toward the mandrel 11, so that the faces 17′ and 18′ will be located at the point of severing 15′. The various steps of the method are then repeated.

It is to be understood that the form of my invention herewith shown and described is to be taken as a preferred example of the same, and that various changes may be made in the order of the steps of the method, without departing from the spirit of my invention of the scope of the subjoined claims. The means for supporting and turning the sleeve, and for feeding the wire longitudinally may also be effected by the means shown in Patent 2,606,268.

Having thus described my invention, I claim:

1. The method of forming a pin having a flattened outer end and welding the pin to a metal part comprising, supporting and holding the metal part, feeding a wire toward the metal part thus supported and held and causing the wire to contact with such metal part, welding the wire to the metal part, arranging blades upon opposite sides of said wire, said blades having contacting faces to provide a shearing action and shoulders disposed adjacent to said faces and the blades projecting forwardly beyond the shoulders, arranging said faces at a selected distance from the metal part to define the length of the pin, effecting a relative closing movement of the blades so that their faces contact to produce a shearing action and the blades sever the wire before the shoulders have clamping engagement with the wire, effecting a relative movement between the supported and held metal part and said faces for spacing the severed end of the pin from said faces, continuing the relative closing movement of said blades while the faces contact and simultaneously effecting a relative closing movement between the shoulders for clamping engagement of the shoulders with the free severed end of the pin to flatten the free end, the spacing of the severed end of the pin from the contacting faces preventing the crowding of the flatened end against one of the blades, effecting a relative opening movement between said shoulders, and then removing the metal part from the supported and held position.

2. A method of forming and welding a pin to a metal part, comprising supporting the metal part at a selected position, feeding a wire longitudinally in a substantially horizontal path toward the metal part and causing the free end of the wire to contact with the metal part, welding the free end of the wire to the metal part, arranging blades having cutting edges and opposed parts above and below the wire and spacing the cutting edges a selected distance from the metal part so that the blades sever at an ascertained severing point, effecting a relative inward movement between the blades and causing the blades to sever the wire at said severing point, then bodily spacing the cutting edges of the blades from the free end of the severed wire and continuing the relative inward movement of the blades to bring said opposed parts together for applying pressure to the opposite sides of the end of the wire to spread the same and form a relatively thin outer end.

3. Apparatus for forming and welding a pin to a metal part, comprising means for supporting the metal part, said supporting means serving as one electrode of a welding circuit, a second electrode connected with the welding circuit and engaging the wire to feed it longitudinally into contact with said metal part, a blade arranged upon one side of the wire, a coacting blade arranged upon the opposite side of the wire, means carrying the blades and movable to shift the blades transversely of and toward the wire to sever the wire at a selected point of severing, the blades being in the closed overlapping position during the severing operation, the blade carrying means being also shiftable longitudinally of the wire from the metal part so that the cutting edges of the blades may be spaced from the free end of the pin, and shoulders carried by the blades to engage opposite sides of the wire at the end of the pin to flatten the outer end of the pin when the blades continue to move inwardly.

4. The method of forming a pin of selected length and having a flattened outer end and welding the end of the pin remote from the flattened end to a metal part comprising, supporting the metal part and holding the same, feeding a wire longitudinally toward the held metal part and holding the wire generally radial with respect to the metal part and causing the free end of the wire to contact with the metal part, welding the free end of the wire to the metal part, arranging elements upon opposite sides of the wire and spaced therefrom, such elements including blades having faces to contact and provide a shearing action and shoulders leading to the faces, arranging said faces at a selected distance from the metal part to determine the length of the pin, effecting a relative closing movement between said elements to sever the wire before the shoulders flatten the wire, effecting a relative movement between the severed end of the pin and said faces for spacing the severed end of the pin from said faces, and then continuing the relative closing movement of said elements while said faces contact for causing the shoulders to have clamping engagement with the pin at its severed end to flatten the end portion, the spacing of the severed end of the pin from said contacting faces preventing the flattened end portion of the severed pin crowding against one of said blades.

5. The method of forming a pin of selected length and having a flattened outer end and welding the end of the pin remote from the flattened end to a metal part comprising, supporting the metal part and holding the same, feeding a wire longitudinally toward the held metal part and holding the wire generally radial with respect to the metal part and causing the free end of the wire to contact with the metal part, welding the free end of the wire to the metal part, arranging elements upon opposite sides of the wire and spaced therefrom, such elements including blades having faces to contact and provide a shearing action and shoulders leading to the faces, arranging said faces at a selected distance from the metal part to determine the length of the pin, moving said elements inwardly toward each other so that said faces contact to produce the shearing action and the blades sever the wire before said shoulders have clamping engagement with the wire to flatten the same, effecting a relative movement between the severed end of the wire and said faces for spacing the severed end of the pin from said faces, and then continuing the inward movement of said elements while said faces contact for causing the shoulders to have clamping engagement with the pin at its severed end to flatten the severed end portion, the spacing of the severed end of the pin from said contacting faces preventing the crowding of the flattened end against one of said blades.

6. The method of forming a metal element and welding the metal element to a metal part comprising, supporting and holding the metal part in a welding position, feeding the metal element toward the metal part thus supported and held to bring the metal element into contact with the metal part, welding the metal element to the metal part, arranging blades upon opposite sides of the metal element and causing the faces of the blades to contact for producing a shearing action, arranging shoulders adjacent to the blades and upon opposite sides of the metal element and disposed rearwardly of the free ends of the blades with respect to the relative closing movement of the blades, simultaneously effecting a relative partial closing movement of the blades and shoulders to sever the metal element before the shoulders are brought into engagement with the metal element, then effecting a relative movement between the supported and held metal part and the blades for spacing the severed end of the metal element from the contacting faces of the blades, simultaneously continuing the relative closing movement of the blades and shoulders and bringing the shoulders into clamping engagement with the free severed end of the metal element to form the same, the spacing of the severed end of the metal element from the contacting faces preventing crowding of the formed end of the metal element against the face of one blade, effecting a relative opening movement between the blades and shoulders and then removing the metal part from the supported and held position.

References Cited in the file of this patent

UNITED STATES PATENTS

| | | |
|---|---|---|
| 2,279,316 | Herzog | Apr. 14, 1942 |
| 2,339,884 | Schlumpf | Jan. 25, 1944 |
| 2,351,722 | Swenson | June 20, 1944 |